United States Patent
Asao et al.

(10) Patent No.: US 6,281,612 B1
(45) Date of Patent: Aug. 28, 2001

(54) STATOR OF AC GENERATOR FOR USE IN VEHICLE AND METHOD OF MANUFACTURING THE SAME

(75) Inventors: Yoshihito Asao; Kyoko Higashino; Katsumi Adachi, all of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/313,640

(22) Filed: May 18, 1999

(30) Foreign Application Priority Data

Nov. 20, 1998 (JP) .................................. 10-330969

(51) Int. Cl.⁷ .............................. H02K 3/04; H02K 3/12
(52) U.S. Cl. ........................ 310/179; 310/208; 29/596; 29/606
(58) Field of Search ....................... 310/254, 208, 310/179, 180; 242/159; 29/596, 605, 606

(56) References Cited

U.S. PATENT DOCUMENTS

| | | | |
|---|---|---|---|
| 3,348,183 | * 10/1967 | Hodges et al. | 29/596 |
| 4,988,055 | * 1/1991 | Sakai et al. | 242/159 |
| 5,174,013 | * 12/1992 | Hiroshima et al. | 29/605 |
| 5,214,839 | * 6/1993 | Rieber et al. | 29/596 |
| 5,306,976 | * 4/1994 | Beckman | 310/215 |
| 5,359,249 | * 10/1994 | Tanaka | 310/216 |
| 5,576,584 | * 11/1996 | Kusumoto et al. | 310/45 |
| 5,714,822 | * 2/1998 | Kawano et al. | 310/179 |
| 5,753,991 | 5/1998 | Couture et al. | 310/156 |
| 5,828,155 | * 10/1998 | Adachi | 310/263 |

FOREIGN PATENT DOCUMENTS

| | | | |
|---|---|---|---|
| 28 17 659 | 10/1979 | (DE) | H02K/15/02 |
| 41 22 076 A1 | 1/1992 | (DE) | H02K/15/06 |
| 4425367 A | 2/1995 | (DE) | H02K/3/48 |
| 1270289 A | 4/1972 | (GB) | H02K/3/00 |
| 8-13182 | 2/1996 | (JP) . | |
| WO 90/10336 | 9/1990 | (WO) | H02K/3/14 |

* cited by examiner

Primary Examiner—Karl Tamai
(74) Attorney, Agent, or Firm—Sughrue, Mion, Zinn, Macpeak & Seas, PLLC

(57) ABSTRACT

A stator coil has tooth portions and slot portions defied between adjacent tooth portions. Each tooth portion has a rectangular cross-section perpendicular to the axis of the stator core. A group of conductor wires received in each slot portion includes conductor wires of a circular cross-sections and conductor wires having polymorphic cross-sections. The ratio (space factor) of the overall cross-sectional area of the conductor wires accommodated by the slot portion relative to the cross-sectional area of the slot portion is not less than 80%.

2 Claims, 9 Drawing Sheets

STATOR OF AC GENERATOR FOR USE IN VEHICLE AND METHOD OF MANUFACTURING THE SAME

BACKGROUND OF THE INVENTION

1. Filed of the Invention

The present invention relates to a stator of the AC generator adapted for use in a vehicle and a method of manufacturing the same and, in particular, to a stator of the AC generator adapted for use in a vehicle and a method of manufacturing the same which serve to enhance rigidity by increasing the space factor of a stator coil which is housed within the slot portion.

2. Description of the Related Art

FIG. 13 is a cross-sectional view illustrating the arrangement of a conventional AC generator adapted for use in a vehicle.

In the conventional AC generator adapted for use in a vehicle, a Lundell type rotor 7 is rotatably fitted into a case 3 comprising a front bracket 1 and a rear bracket 2 each made of aluminum by way of a shaft 6, while a stator 8 is fixedly fitted to the surface of the inner wall of the case 3 in such a way that the stator 8 covers the outer periphery of the rotor 7.

A shaft 6 is rotatably supported against the front bracket 1 and the rear bracket 2. A pulley 4 is fixedly fitted to one end of this shaft 6 so that the rotational torque of the engine may be transmitted to the shaft 6 by way of a belt (not shown).

A slip ring 9 which supplies a current to the rotor 7 is rigidly fitted to the other end portion of the shaft 6, and a pair of brushes 10 is housed within a brush holder 11 disposed within the case 3 so that it may lie in slideable contact with the slip ring 9. A regulator 18, which regulates the output voltage of the stator 8, is adhered to a heat sink 17 fitted on the brush holder 11. A rectifier 12 is electrically connected to the stator 8 to rectify the alternating current generated in the coil of the stator 8 into the direct current and is mounted within the case 3.

The rotor 7 comprises a rotor coil 13 which generates the magnetic flux when a current flows therein, and a pair of pole cores 20, 21 provided to cover the rotor coil 13 and be magnetic poles as a result of the magnetic flux generated by the rotor coil 13. The pair of pole cores 20, 21 are made of iron, and a plurality of claw-shaped magnetic poles 22, 23 are provided on the outer circumference of the poles cores 20, 21 so as to protrude at equiangular intervals in their circumferential direction. The pole cores 20, 21 are fixedly fitted to the shaft 6 in an opposed relation to each other so that their claw-shaped magnetic poles 22, 23 are able to engage with each other. Further, fans 5 are fixedly attached to both axial ends of the rotor 7.

The stator 8 comprises a stator core 15 and a stator coil 16 achieved by winding a conductor wire around the stator core 15, and an alternating current is generated by alternating the magnetic flux of the rotor 7 with the rotation of the rotor 7.

In such conventional AC generator, the current is supplied to the rotor coil 13 from a battery (not shown) by way of the brush 10 and the slip ring 9, thereby generating the magnetic flux. Owing to this magnetic flux, the claw-shaped magnetic poles 22 of one pole core 20 are magnetized to N polarities, while the claw-shaped magnetic poles 23 of the other pole core 21 are magnetized to S polarities. On the other hand, the rotational torque of the engine may be transmitted to the shaft 6 by way of the belt and the pulley 4, causing the rotor 7 to rotate. As a result, a rotational magnetic field is imparted to the stator coil 16, and an electromotive force may take place in the stator coil 16. This AC electromotive force passes through the rectifier 12 to be rectified into a direct current, its voltage is regulated by the regulator 18 and the battery is electrically charged.

Here, in a common AC generator for use in a vehicle, the stator core 15 has a core back portion 15a, substantially rectangular tooth portions 15b protruding from the core back portion 15a in the direction of the inner circumference thereof, and notch portions 15d provided on the outer circumference of the core back portion 15a so as to oppose to the tooth portions 15b respectively. The tooth portions 15b are provided, for example, 36 at the equiangular intervals as viewed in the circumferential direction, and a slot portion 15c which is interleaved between adjacent tooth portions 15b, 15b may serve as a space into which the coil is inserted. The 36 tooth portions 15b are each opposed to 12 nailed-shaped magnetic poles 22, 23 by way of a minor clearance as viewed in the inner direction, and the magnetic flux caused by the rotational magnetic field flows as indicated by broken line of FIG. 14. Incidentally, in FIG. 14, for the sake of convenience, the claw-shaped magnetic poles 23 are not shown.

Accordingly, the major portion of each tooth portion 15b, which serves as a passageway for a predetermined magnetic flux to pass through has preferably a uniform cross-sectional area because the magnetic flux is not branched off and is not increased or decreased, and does not increase or decrease there. That is, in order to unify the density of the magnetic flux within the tooth portion 15b, the shape of each tooth portion 15b is preferably of rectangular form rather than of trapezoidal form. Further, the tip portion of each tooth portion 15b has a circumferentially extending portion so as to exclude leakage of the magnetic flux to smooth the density of the magnetic flux at the air gap.

Next, a conventional method of manufacturing the stator 8 is described with reference to FIGS. 15 and 16.

First, a thin steel plate member is supplied to a press processing machine (not shown) to form two-way belt-shaped members 30 each having the core back portion 30a and the tooth portion 30b from the one-way thin steel plate member, as shown in FIG. 15. At this time, arcuate notch portions 30c are provided on the outer circumference of the core back portion 30a so as to oppose to the tooth portions 30b respectively. With the core back portions, tooth portions and the notch portions aligned with each other, the two-way belt-shaped members 30 are overlapped and are wound in a hollow cylindrical form. Next, the cylindrically wound belt-shaped members 30 are welded for integration, and then are subjected to insulating coating to obtain a hollow cylindrical stator core 15, as shown in FIG. 16. In this stator core 15, the core back portion 30a, tooth portion 30b and notch potion 30c of the belt-shaped member 30 are each consecutive in the axial direction to form a core back portion 15a, a tooth portion 15b and a notch portion 15d.

Next, the tip portion of a group of coils formed in the form of a star (not shown) is deformed to insert into each slot portion 15c of the stator core 15 from the side of the inner circumference thereof, while the part of the coils extending from the slot portion 15c is deformed in the circumferential direction to obtain the stator 8.

Incidentally, this conventional method of manufacturing the stator is described in, for example, Japanese Unexamined Patent Publication No. 60-7898 and Japanese Patent No. 2541381.

Here, in the belt-shaped member 30 obtained by punching the thin steel plate, as shown in FIG. 15, the major portion of each tooth portion and each slot portion is of rectangular form. When the belt-shaped member 30 is wound in the from of a hollow cylinder, the tip end portions of the tooth portions each become close to each other in the circumferential direction with the result that each slot portion achieves a substantially trapezoidal form which spreads in the outer circumferential direction, as shown in FIG. 16.

Further, used for the stator coil 16 is a conductor wire of circular form in cross section in view of the workability and ease of availability.

In the AC generator, in order to generate the amount of magnetic flux for electrical generation as many as possible, it is necessary to accommodate a large number of conductor wires, that is, a conductor wire having as many the number of turns as possible within each slot portion 15c. In the conventional stator 8, as shown in FIG. 17, since a conductor wire of circular form in cross section is used for the stator coil 16 to accommodate within the slot portion 15c of substantially trapezoidal form, the overall cross-sectional area of the conductor wire which may be accommodated within the slot portion 15c cannot exceed $(\pi/4) \times D^2 \times n$ theoretically. Incidentally, D denotes the diameter of the conductor wire, and n denotes the number of conductor wires which may be accommodated within the slot portion. In view of the presence of thickness of the insulating coating of the stator core 15 and the stator coil 16, the ratio occupied by the overall cross-sectional area of the conductor wire relative to the slot area (space factor) will account for approximately 50 to 66%.

In this kind of AC generator, in order to improve the output, it has been necessary to accommodate a large number of conductor wires, that is, a conductor wire having as many turned as possible within the slot to generate a large amount of magnetic flux caused by the rotational magnetic field.

In order to achieve a conductor wire having as many turns as possible within the same inner area of the slot, one may make the diameter of the conductor wire thin. However, if the diameter of the conductor wire is made thin, then the resistance of the conductor wire is increased, which makes it impossible to obtain a sufficient output while, at the same time, increasing heat generation in excess of the permissible temperature of the conductor wire. Therefore, how many times a thick conductor wire can be turned serves as a key to achieving a high output. This amounts to increasing the space factor, the ratio occupied by the cross-sectional area of the wire relative to the internal area of the slot, but if it is increased, then the friction of the turns of the wire especially within the slot of the stator core while being turned causes the insulating coating film of the wire to be broken, or results in the loss of the withstand voltage performance between the rotor core and the stator coil.

In order to eliminate such drawbacks, a technique of aligning a coil of rectangular cross-section into the slot of the stator core for accommodation is described in, for example, Japanese Examined Patent Publication No. 8-13182. However, in this conventional embodiment, since the cross-section of the slot is formed into a substantially rectangular form in order to accommodate the coil of rectangular cross-section without any waste of space, the major portion of the tooth portion is formed into a trapezoidal form spreading in the direction of outer circumference resulting in a stator having a magnetically wasteful portion. Therefore, in order to achieve an equivalent amount of magnetic flux as that of the tooth portion whose major portion is formed into a rectangular form, it has been necessary to make the slot area smaller correspondingly. Conversely, if the slot areas are made as equal, then the amount of magnetic flux is decreased and a sufficient output cannot be achieved.

Further, due to the recent trend for achieving high output, the electromagnetic noise caused by vibrations of parts generating during electrical generation has caused a problem. The major cause of the electromagnet noise is mainly due to the radial vibrations of the stator core 15 (stator), as shown in FIGS. 18 to 20. In order to suppress those, a noise suppressing member has been fitted into the outer circumference of the stator core, or the thickness of the core back portion of the stator core is increased so as to increase rigidity of the stator, which, however, have not served as a realistic countermeasure because they accompany increase of weight or cost.

SUMMARY OF THE INVENTION

The present invention has been provided in order to solve the foregoing problems, and its object is to achieve a stator of AC generator for use in a vehicle and a method of manufacturing the same in which at least one of a group of the conductor wires which constitute the rectilinear portion of the stator coil which is accommodated within the slot portion of the stator core is formed into a polymorphic cross-section while the ration occupied by the conductor wire within the slot portion (space factor) is not less than 80% to reduce the electromagnetic noise with a high output maintained.

In order to achieve the foregoing object, according to one aspect of the present invention, there is provided a stator of AC generator for use in a vehicle comprising: a cylindrical stator core in which a plurality of tooth portions are provided at equiangular intervals along the inner circumference of a cylindrical core back portion and a plurality of slot portions are each formed between adjacent tooth portions; and a stator coil incorporated in the stator core, the stator coil having a group of coils constituted by predetermined numbers of turns of conductor wires and including a plurality of rectilinear portions and coil end portions interconnecting the end portions of adjacent rectilinear portions, the rectilinear portions being sequentially accommodated in the slot portions of every predetermined number of slots and the coil end portions being protruded axially outwardly from the end surface of the stator core; wherein the cross-section of the major portion of the tooth portion intersecting at a right angle with axis of the stator core is formed in a rectangular form; wherein at least one of the group of conductor wires constituting the rectilinear portion, which are accommodated within the slot portion, is formed into a polymorphic cross-section; and wherein the ratio of the overall cross-sectional area of the group of conductor wires constituting the rectilinear portion accommodated within the slot portion relative to the cross-sectional area of the slot portion is not less than 80%.

In accordance with another aspect of the present invention, there is provided a method of manufacturing a stator of AC generator for use in a vehicle comprising steps of: forming, from a thin steel plate member, a plurality of belt-shaped members each having a predetermined number of tooth portions each which has a rectangular major portion formed at a predetermined interval; integrally laminating the predetermined number of belt-shaped members to form a core member taking the form of a rectangular parallelepiped;

forming, by turning conductor wires a predetermined number of times, a group of planar coils in which a plurality of rectilinear portions and coil end portions for interconnecting the end portions of adjacent rectilinear portions are formed in a planar shape; deforming at least one of the conductor wires constituting the rectilinear portions of the group of planar coils into a polymorphic cross-section; inserting the rectilinear portions of the group of planar coils into the slot portions of the core member taking the form of a rectangular parallelepiped to incorporate the group of planar coils in the core member; and bending the core member into which the group of planar coils are incorporated into a cylindrical form to bring both ends of the core member into abutment with each other and welding the abutting ends of the core member.

DETAILED DESCRIPTION OF THE PREFERRED EMBODIMENTS

Several embodiments according to the present invention are hereinafter described with reference to the drawings.

First Embodiment

Figure 1:
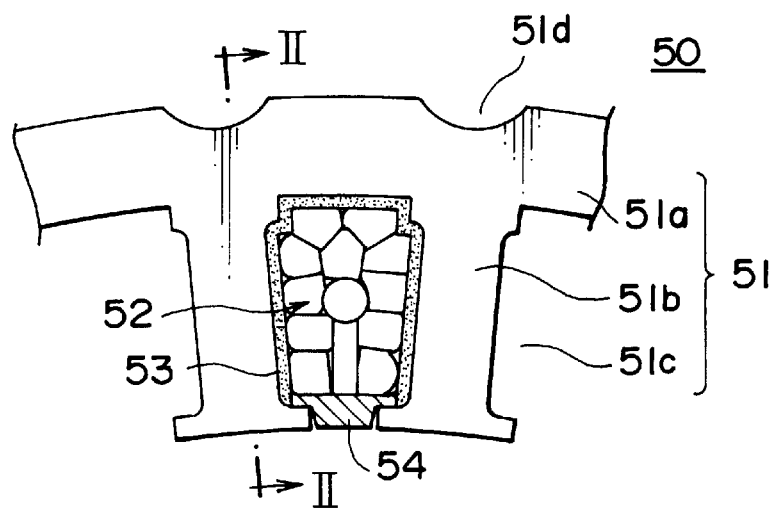
FIG. 1 is an enlarged view of the essential portion of a stator of AC generator for use in a vehicle according to a first embodiment of the present invention.
Figure 2:
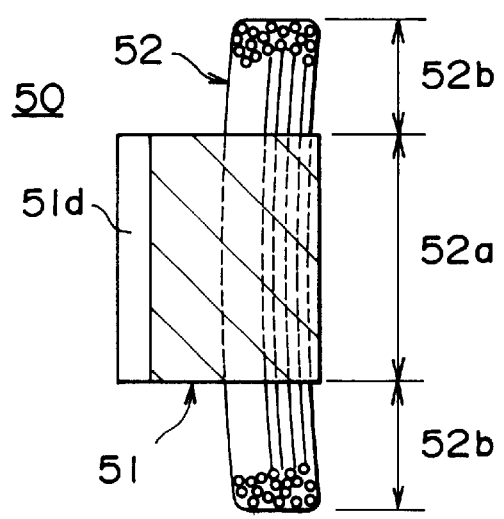
FIG. 2 is a cross-sectional view of the stator taken along line II—II of FIG. 1.

FIG. 1 is an enlarged view of the essential portion of a stator of AC generator for use in a vehicle according to a first embodiment of the present invention and FIG. 2 is a cross-sectional view of the stator of FIG. 1 taken along line II—II thereof.

Referring to FIGS. 1 and 2, a stator core 51 comprises a hollow cylindrical core back portion 51a, a plurality of tooth portions 51b provided at equiangular intervals in the circumferential direction of the core back portion 51a each which protrude from the core back portion 51a in the direction of the inner circumference, and a plurality of notch portions 51d provided on the outer circumference of the core back portion 51a at equiangular intervals in the circumferential direction of the core back portion 51a. The cross-sectional form of the major portion of each tooth portion 51b intersecting at a right angle with the axial direction of the stator core 51 is formed into a rectangular form, and each slot portion 51c is formed into a trapezoidal form spreading outwardly. If the number of poles of the rotor is six as usual, then the number of the slot portions 51c will be thirty six.

An insulatire-coated conductor wire is sequentially inserted into every third slot portion 51c around the stator core 51. When one round is completed, a second round is made inserting the wire into the same slot portions 51c, and this is repeated a predetermined number of times to form one phase of a stator coil 52 according to the concentrated winding method. In a similar way, the slot portions 51c into which wires are inserted are staggered to form three phases of stator coil 52. Each of the stator coils 52 is composed of rectilinear portions 52a which are inserted into the slot portions 52c, and coil end portions 52b which interconnect between adjacent rectilinear portions 52a at the outside of the stator core 51 in the axial direction thereof. At least one of the number of conductor wires which constitute each rectilinear portion 52a is formed into a polymorphic cross-section, and a number of conductor wires constituting each coil end portion 52b are all formed into a substantially circular cross-section.

Figure 13:
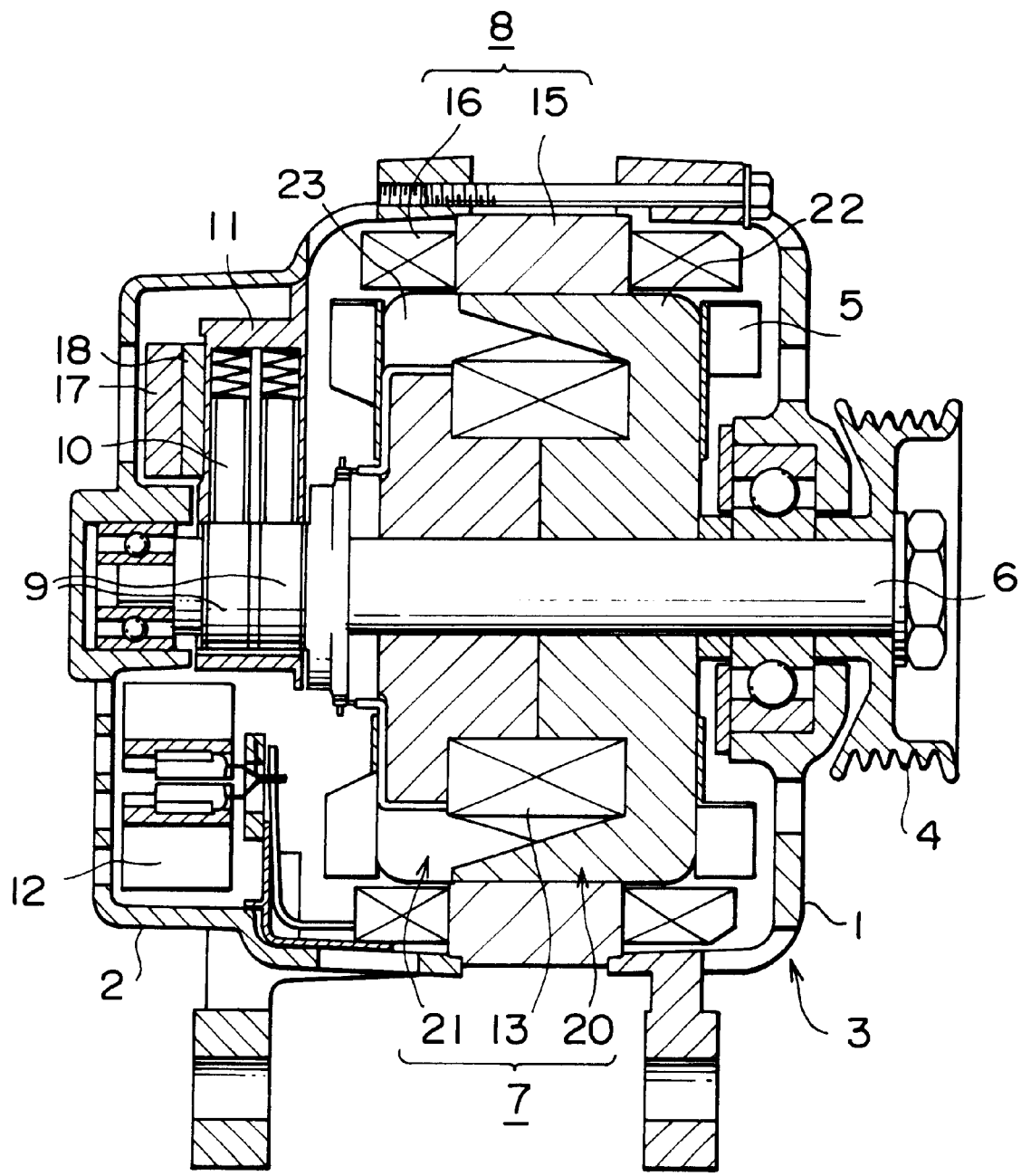
FIG. 13 is a cross-sectional view of the arrangement of a conventional AC generator.
Figure 14:
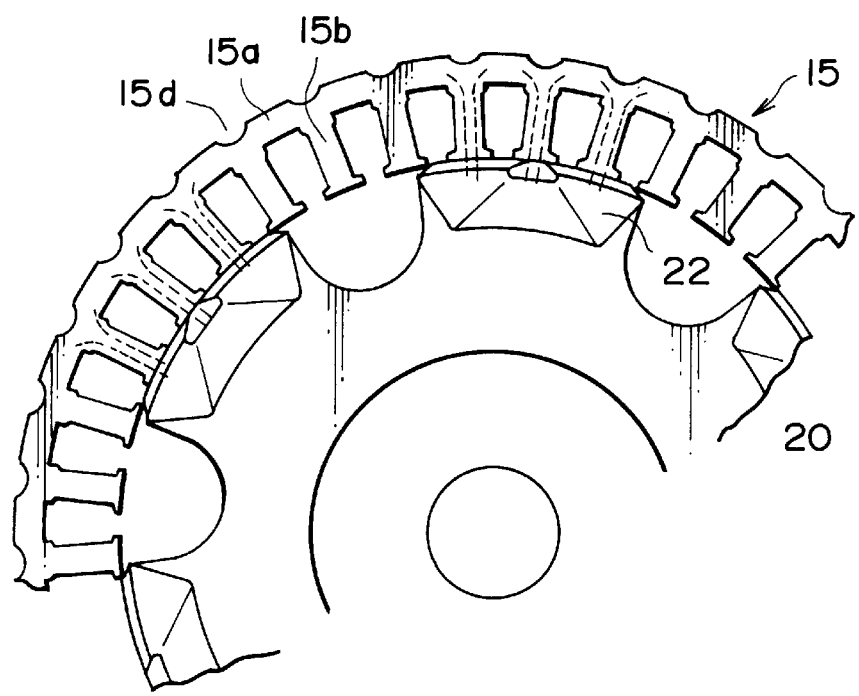
FIG. 14 is a view for explaining the magnetic flux flowing through the stator core in the AC generator for use in a vehicle.
Figure 15:
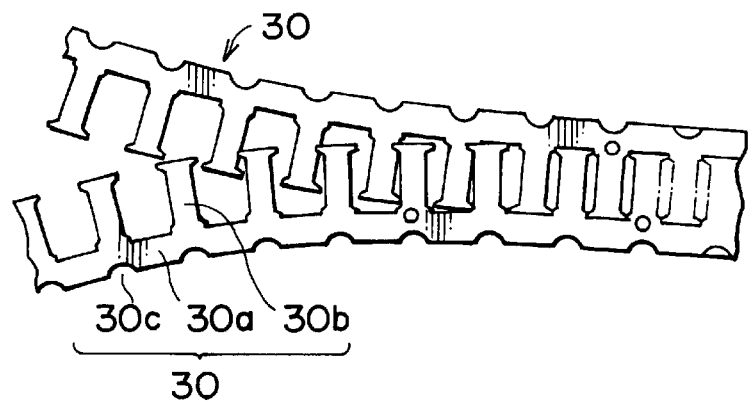
FIG. 15 is a plan view illustrating process of forming a belt-shaped member in a conventional method of manufacturing a stator of AC generator.
Figure 16:
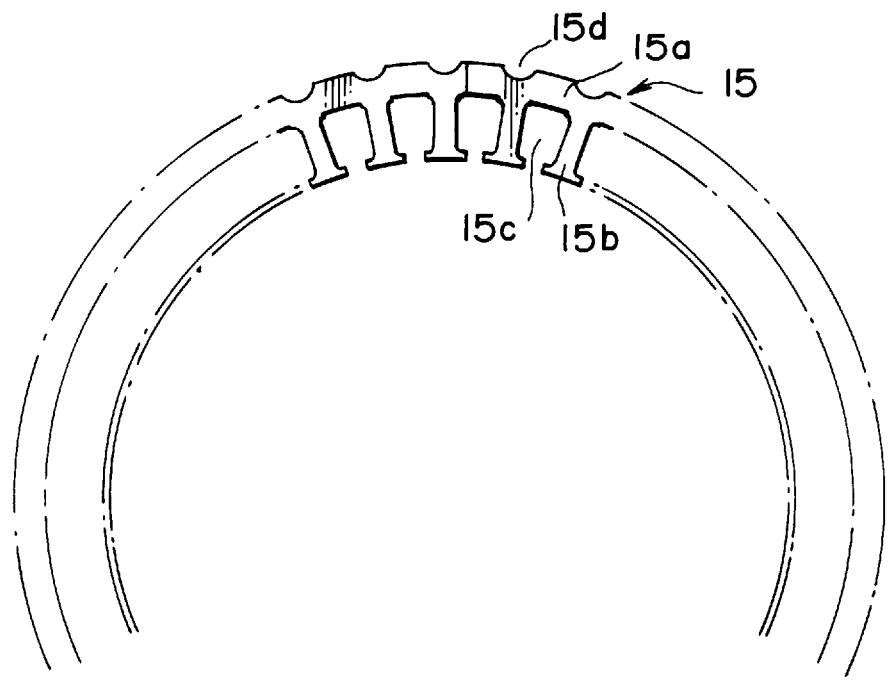
FIG. 16 is a side view illustrating a cylindrical stator core manufactured according to the conventional method of manufacturing the stator of AC generator.
Figure 17:
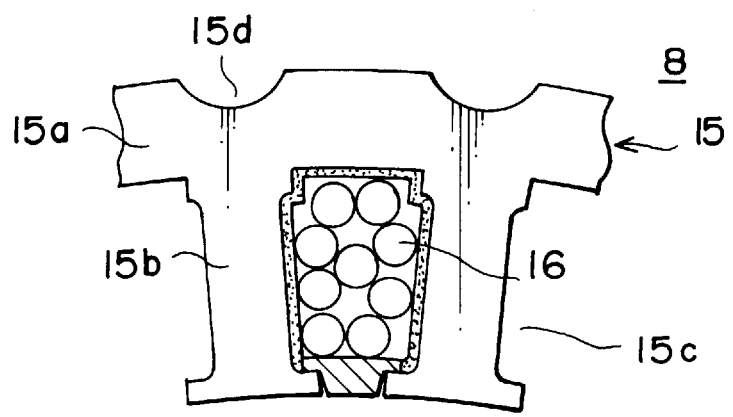
FIG. 17 is an enlarged view of the essential portion of a conventional stator of AC generator.

The stator 50, as such, is incorporated into the AC generator of FIG. 13 for use in a vehicle in place of the stator 8. Incidentally, since the operation the AC generator incorporated with the stator 50 is similar to that of the conventional one, its specific description is left out.

Further, the polymorphic cross-section mentioned herein refers to one in which at least part of the outer circumference of the cross-section is formed into a rectilinear side.

Further, an insulating coating 53 is applied to the inner surface of the wall of each slot portion 51c of the stator core 51 in order to secure the electrical insulation between the stator core 51 and the stator coil 52, and in order to prevent the stator coil 52 from popping out, a wedge 54 is fitted into each slot portion 51c. Further, varnish (not shown) is impregnated into each slot portion 51c so that the stator core 51 and the stator coil 52 are made integral.

In this first embodiment, since at least one of the number of conductor wires constituting the rectilinear portions 52a of the stator coil 52 is formed into the polymorphic cross-section, the wires can be accommodated closely within the slot portion 51c, resulting in the stator 510 high in occupation ration (space factor).

When the wires having this arrangement are accommodated into the slot portion 51c with 13 turns, the space factor accounts for 90% with the result that, as compared with a case in which 13 turns of a wire of circular cross-section are accommodated into the slot portion, about 20% of the conductor area can be additionally accommodated with the same slot area while the resistance and the heat generation become about 0.8 times, which may allow a high output.

Further, since the cross-section of the major portion of the tooth portion 51b which intersects at a right angle with the axial direction of the core is formed into the rectangular form, the density of the magnetic flux within the tooth portion 51b can be unified. As a result, the stator core 51 becomes free of any wasteful portion, and the slot area can be made greater allowing a high output to be achieved.

Still further, since the number of conductor wires constituting the coil end portion 52b are comprised of a number of wires of circular cross-section, even if during the formation of the coil end portion 52b, any bending or torsion is applied to them, occurrence of the severance of the wire can be avoided to thereby improve its reliability.

Figure 3:
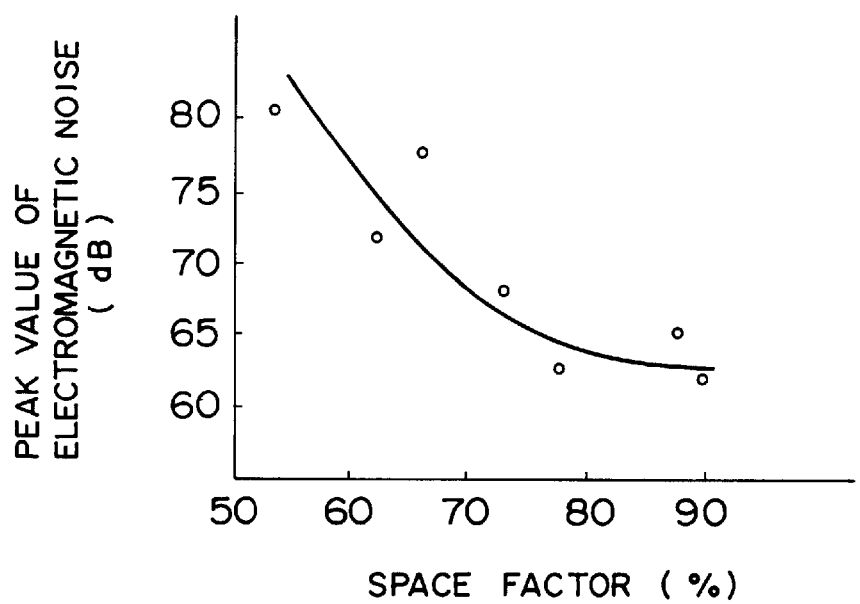
FIG. 3 is a graphic view illustrating the relationship between the peak value of the electromagnetic noise and the space factor.

Next, the relationship between the space factor and the peak value of the electromagnetic noise is described. FIG. 3 illustrates the result of measured peak values of the electromagnetic noise that occurs when the space factor of the stator which is incorporated into the AC generator is changed and the AC generator is driven at the rate of 2000 r.p.m.

From FIG. 3, it can be seen that electromagnetic noise tends to be reduced, as the space factor becomes greater, but that when the space factor exceeds 70%, it is reduced to a lesser degree.

This effect of diminishing electromagnetic noise is thought to be the result from increase of rigidity of the stator 50 caused by increase of the number of conductor wires inserted into the slot portion 51c whereby the occurrence of the electromagnetic noise is suppressed.

In addition, other than the conductor wires, varnish is also sealed into the slot portion 51c, and taking the presence of the varnish into account, if the space factor exceeds 75%, then the interior of the slot portion 51c becomes dense and the rigidity of the stator 50 is also sufficiently increased, so that even if the space factor is increased more than that, the effect of increasing the rigidity becomes small. As a result, it is inferred that if the space factor exceeds 75% the effect of reducing the electromagnetic noise becomes small.

Therefore, in view of the need to reduce the electromagnetic noise, the space factor is preferably not less than 80%.

Figure 4:
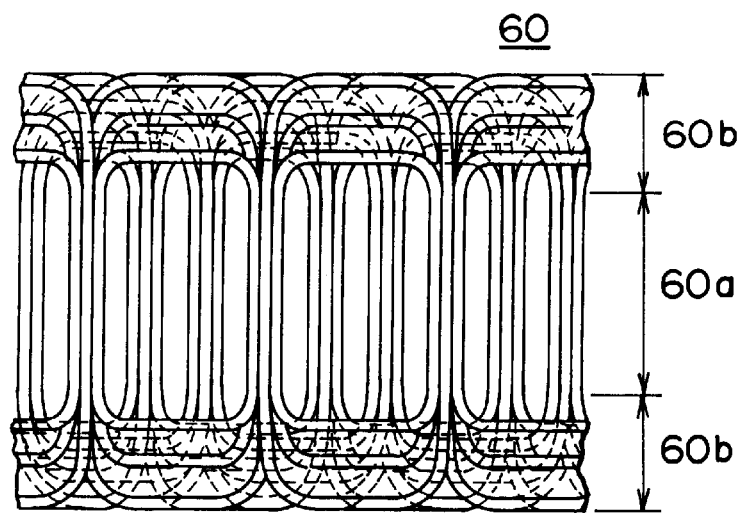
FIG. 4 is a plan view illustrating a group of planar coils incorporated within the stator core of AC generator according to the first embodiment of the present invention.

Next, a method of manufacturing the stater 50 arranged as above is described with specific reference to FIGS. 4 to 9. FIG. 4 illustrates a group of planar coils which are applied to the manufacture of the stator 50, and FIGS. 5 to 9 illustrate each process of manufacturing the stator 50.

A group of planar coils 60 which are applied to the manufacture of this stator 50 are, as shown in FIG. 4, arranged be forming a group of coils having a conductor wire formed into a circular cross-section and turned a predetermined number of times so that a plurality of rectilinear portions 60a each inserted into each slot portion 51c and a coil end portion 60b for interconnecting between adjacent rectilinear portions are formed in a planar fashion. Before this group of planar coils 60 are fitted into the stator core 51, a predetermined number of the conductor wires each constituting that rectilinear portion 60a are deformed into a desired polymorphic cross-section.

Figure 5:
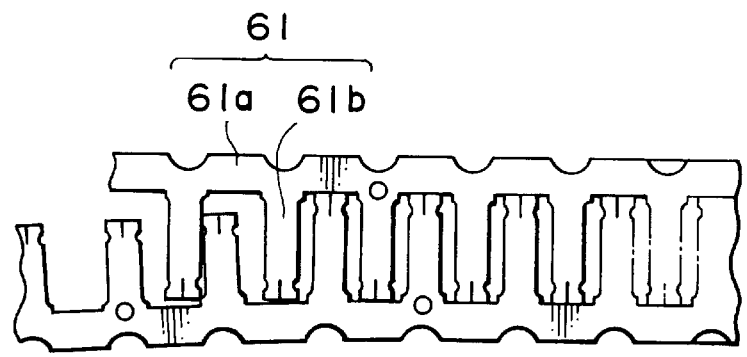
FIG. 5 is a plan view illustrating a process of forming a belt-shaped member in the method of manufacturing the stator of AC generator according to the first embodiment of the present invention.

First, a thin steel plate member is supplied to a press processing machine (not shown), and as shown in FIG. 5, two-way belt-shaped members 61 each having a core back portion 61a and tooth portions 61b are formed of a one-way thin steel plate member. At this time, notch portions 61c are provided so as to lie at the outer circumference of the core back portion 61a and oppose to the tooth portions 61b respectively. After that, the core back portions, tooth portions and notch portions are aligned to overlap a predetermined number of belt-shaped members 61 to each other to caulk for integration, and then they are subjected to an insulating coating to obtain a core member 62 of rectangular parallelepiped.

Figure 6:
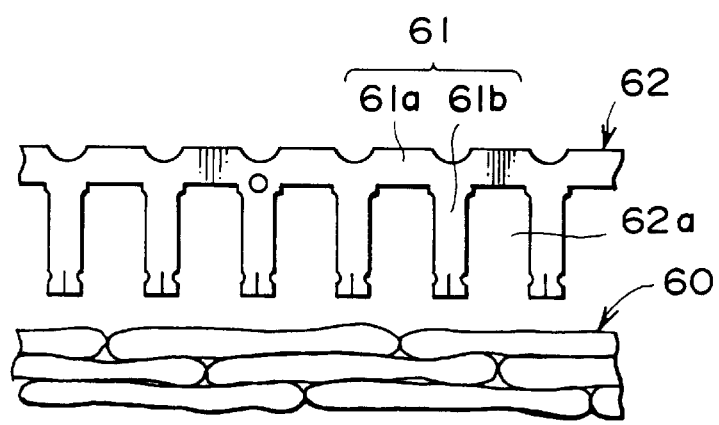
FIG. 6 is a top view illustrating a process of incorporating the group of planar coils into the stator core in the method of manufacturing the stator of AC generator according to the first embodiment of the present invention.
Figure 7:
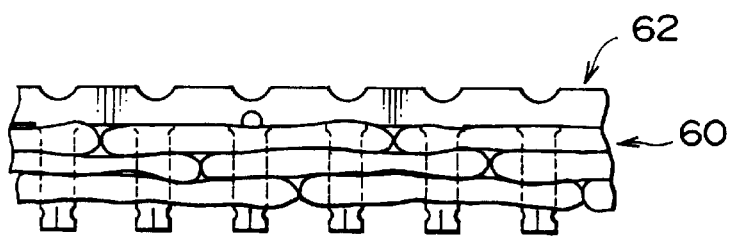
FIG. 7 is a top view of the incorporated the group of planar coils into the stator core in the method of manufacturing the stator of AC generator according to the first embodiment of the present invention.
Figure 8:
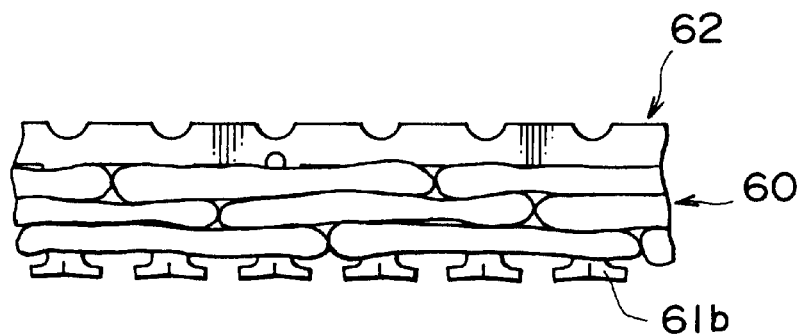
FIG. 8 is a top view illustrating a process of opening the tip end of the tooth portion in the method of manufacturing the stator of AC generator according to the first embodiment of the present invention.
Figure 9:
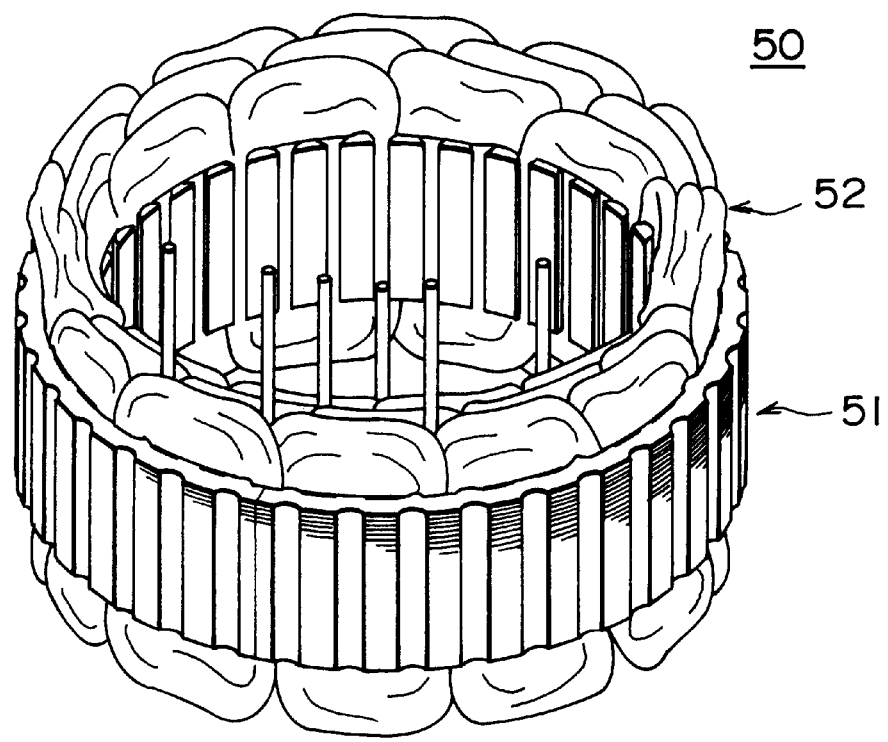
FIG. 9 is a perspective view illustrating a stator manufactured according to the first embodiment of the present invention.

Then, as shown in FIGS. 6 and 7, each rectilinear portion 61a of the planar coils 60 is inserted into each slot portion 62a of the core member 62. After that, as shown in FIG. 8, the tip end portion of each tooth portion 61b is spread in the circumferential direction. Further, the core member 62 is bent into a cylindrical form, and the end portions are made to align with each other for integral welding. After that, varnish is immersed therein for hardening, and as shown in FIG. 9, a stator 50 results having the stator coil 52 fitted into the stator core 51.

In the stator 50 thus obtained, the core back portions 61a, tooth portions 61b and notch portions 61c of the belt-shaped members 61 each run consecutively in the axial direction to form the core back portion 51a, tooth portions 51b and notch portions 51d.

Since the notch portions 61c are formed during formation of the belt-shaped member 61, the core member 62 taking the form of a rectangular parallelepiped, which is integrally laminated with the belt-shaped members 61, become easy to bend into the cylindrical form, and the workability of the stator is improved while, during bending, since the tooth portions are unlikely to suffer distortion, a reliable stator can be obtained.

Here, provision of the notch portions 51d on the outer circumference of the stator core 51 assures improvement of the workability of the core while causing increase of the electromagnetic noise due to the magnetic attractive force as well as reduction of the rigidity. However, since the space factor is not less than 80%, the rigidity of the stator 50 is reinforced, which in turn eliminates reduction of the rigidity of the stator core 51 resulting from provision of the notch portions 51d to reduce the electromagnetic noise. As a result, it becomes unnecessary to fit any member for suppressing the noise in the outer circumference of the stator core, or thicken the core back potion, and a stator small in electromagnetic noise can be obtained without accompanying increase of weight or cost.

Further, since the rectilinear portion 61a of the planar coils 60 is inserted into the slot portion 62a of the core member 62 taking the form of a rectilinear parallelepiped, the task of deforming or forming the group of coils, which is carried out when the coils formed into a star form are fitted into the core member formed into the hollow cylindrical body, is alleviated. Therefore, the workability of inserting the coil is improved to increase the productivity while severance of the coil during its deformation o:r formation is eliminated, defective articles are reduced and a high yield can be realized. Still further, the distortion of the conductor wire caused by deformation or formation of the coil may be reduced resulting in an improved reliability.

Further, since, after the planar coils 60 are incorporated, the tip end of the tooth portion 51b is spread in the circumferential direction, the circumferential protrusion of the end of the tooth portion 51b cannot block insertion of the planar coils 60 into the slot portion 51c, and eases their insertion without damaging the wires. Since the tip end of the tooth portion 51b is spread in the circumferential direction, leakage of the magnetic flux is suppressed, which allows the density of the magnetic flux at the air gap to be smoothed.

Incidentally, according to the foregoing method of manufacturing the stator 50, although the predetermined number of conductor wires which constitute the rectilinear portion 60a of the planar coils 60 are deformed into the polymorphic cross-section before the coils 60 are fitted into the core member 62, after they are fitted into the core member 62, the rectilinear portion 60a of the planar coils 60 may be pressed from the opening side of the slot portion 62a to deform them into the polymorphic cross-section. In this case, the conductor wires constituting the rectilinear portion 60a of the planar coils 60 can readily be deformed into the polymorphic cross-section.

Further, in the foregoing method, although the planar coils 60 are fitted into the core member 62 taking the form of a rectangular parallelepiped, the core member is not always restricted to ones of such form, but alternatively, may be hollow cylindrical ones formed by winding an elongated belt-shaped member having the core back portion and the tooth portion in the cylindrical form.

Still further, there is no need to provide the notch portions 51d as many as the tooth portions 51b, but they may be provided for each plurality of tooth portions 51b. Further, the notch portion 51d may be provided plural number at one place.

Second Embodiment

In the foregoing first embodiment, as shown in FIG. 1, the rectilinear portion 52a of the stator coil 52 is constituted, for the most part, the conductor wires deformed into the polymorphic cross-section. In this case, the need to increase the space factor has caused the kinds of cross-section of the deformed wire to be increased, which has complicated the process of deforming the wires constituting the rectilinear portion 52a.

Figure 10:
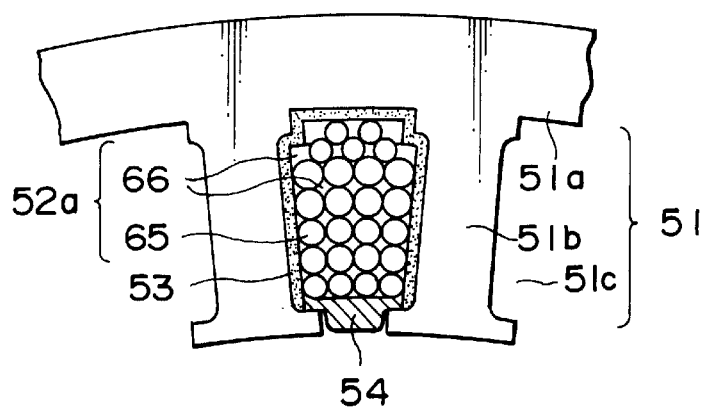
FIG. 10 is an enlarged view of the essential portion of a stator of AC generator according to a second embodiment of the present invention.

In this second embodiment, as shown in FIG. 10, the rectilinear portion 52a of the stator coil 52 is constituted, for the most part, the conductor wires formed into the circular cross-section, in which the space between the conductor wires 65 having the circular cross-section is embedded with the conductor wires 66 deformed into the polymorphic cross-section.

Therefore, according to this second embodiment, the kinds of the cross section of the deformed wire may be small to reduce the number of processes of deforming the wires constituting the rectilinear portion 52a while at the same time allowing the wires to be densely accommodated within the slot portion to achieve a great space factor.

Further, in this second embodiment, since no notch portion is provided on the stator core 51, the rigidity of the stator core 51 is strengthened and the electromagnetic noise can be reduced.

Third Embodiment

Figure 11:
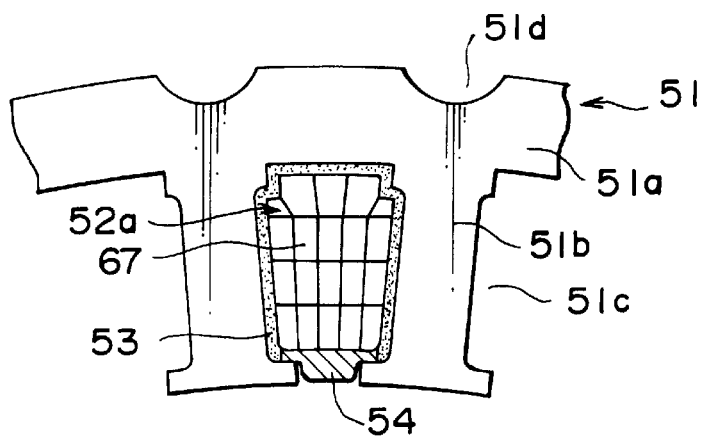
FIG. 11 is an enlarged view of the essential portion of a stator of AC generator according to a third embodiment of the present invention.

In this third embodiment, as shown in FIG. 11, the rectilinear portion 52a of the stator coil 52 is entirely constituted by the conductor wire 67 deformed into the polymorphic cross-section whose polymorphic cross-section is accommodated within the slot portion 51c so as to direct the longitudinal direction thereof in the radial direction of the stator core. Incidentally, its portions other than that are arranged as in the foregoing first embodiment.

Figure 12:
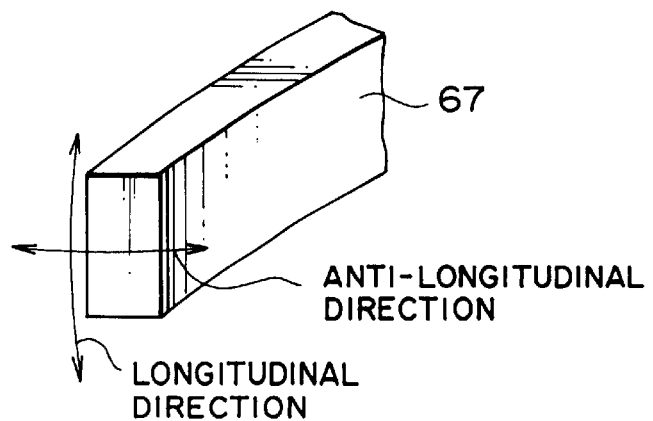
FIG. 12 is a view for explaining the bending moment for the conductor wire.

The conductor wire 67 of rectangular cross-section is high in its rigidity relative to the longitudinal bending moment as shown in FIG. 12 as compared with its anti-longitudinal one.

Figure 18:
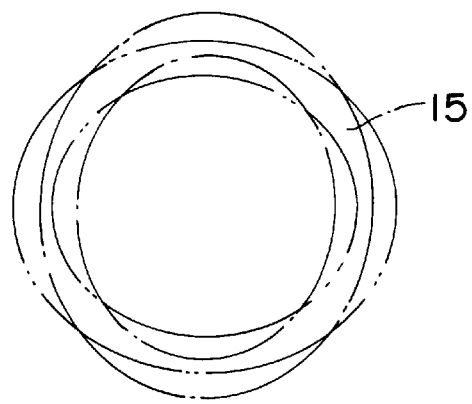
FIG. 18 is a schematic view illustrating an example of the vibration mode of the stator core.
Figure 19:
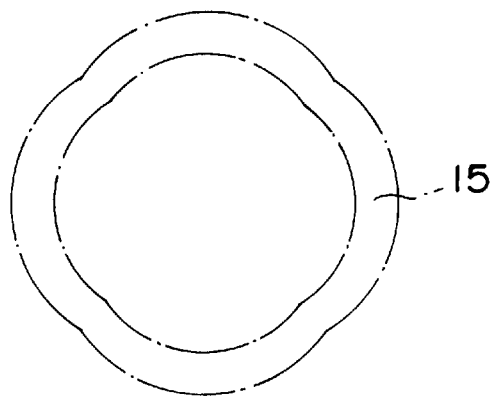
FIG. 19 is a schematic view illustrating another example of the vibration mode of the stator core.
Figure 20:
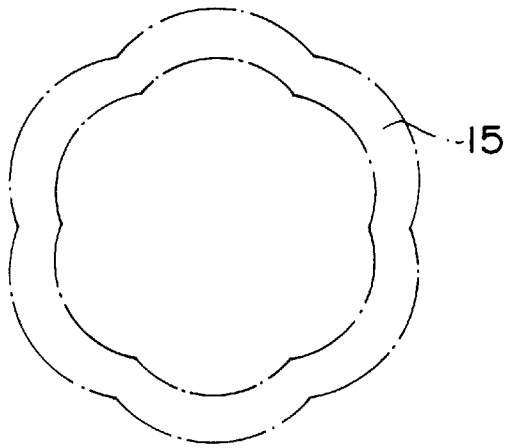
FIG. 20 is a schematic view illustrating a still another example of the vibration mode of the stator core.

Therefore, in this third embodiment, since the polymorphic cross-section of the wire 67 is accommodated within the slot portion 51c so as to direct the longitudinal direction thereof in the radial direction, the radial rigidity of the stator 50 may be further strengthened over the entire circumference. As a result, the vibration amplitude due to the radial vibration mode of the stator shown in FIGS. 18, 19 and 20, which serves as a cause of the electromagnetic noise, is suppressed to reduce the electromagnetic noise.

Incidentally, although, in the foregoing embodiments, description is made as to the stator coil called the concentrated winding method, the present invention may assure a similar advantage even if applied to the stator coil of distributed winding method.

Since this invention is arranged as above, the following advantages may be obtained.

According to the present invention, as described above, there is provided a stator of AC generator for use in a vehicle(e comprising a cylindrical stator core in which a plurality of tooth portions are provided at equiangular intervals along the inner circumference of a cylindrical core back portion and a plurality of slot portions are each formed between adjacent tooth portions; and a stator coil incorporated in the stator core, the stator coil having a group of coils constituted by predetermined numbers of turns of conductor wires and including a plurality of rectilinear portions and coil end portions interconnecting the end portions of adjacent rectilinear portions, the rectilinear portions being sequentially accommodated in the slot portions of every predetermined number of slots and the coil end portions being protruded axially outwardly from the end surface of the stator core; wherein the cross-section of the major portion of the tooth portion intersecting at a right angle with axis of the stator core is formed in a rectangular form; wherein at least one of the group of conductor wires constituting the rectilinear portion, which are accommodated within the slot portion, is formed into a polymorphic cross-section; and wherein the ratio of the overall cross-sectional area of the group of conductor wires constituting the rectilinear portion accommodated within the slot portion relative to the cross-sectional area of the slot portion is not less than 80%. Therefore, the rigidity of the stator can be increased without incurring the degradation of the magnetic characteristic, and a stator of AC generator having a high output and small in electromagnetic noise can be obtained.

Further, since the group of conductor wires constituting the rectilinear portion, which are accommodated within the slot portion, is comprised of the group of wires having a circular cross-section and the number of wires having a polymorphic cross-section, the number of lads can be accommodated densely within the slot portion, and the rigidity of the stator can be improved.

Still further, at least one of the group of wires of polymorphic cross-section, which constitute the rectilinear portion, which are accommodated within the slot portion, is directed such that the longitudinal axis of cross-section thereof extends in the radial direction of the stator core, the radial rigidity of the stator can be improved to suppress the radial vibration, which serves as a major cause of the electromagnetic noise.

Further, since the notch portion is provided on the outer circumference of the stator core in parallel to axis thereof, the productivity can be improved.

Further, since the group of wires constituting the coil end portion is comprised of the group of wires having a circular cross-section, the coil end portion can readily be deformed.

Further, the method of manufacturing the stator of AC generator for use in a vehicle according to the present invention comprises steps of: forming, from a thin steel plate member, a plurality of belt-shaped members each having a predetermined number of tooth portions each which has a rectangular major portion formed at a predetermined interval; integrally laminating the predetermined number of belt-shaped members to form a core member taking the form of a rectangular parallelepiped; forming, by turning conductor wires a predetermined number of times, a group of planar coils in which a plurality of rectilinear portions and coil end portions for interconnecting the end portions of adjacent rectilinear portions are formed in a planar shape; deforming at least one of the conductor wires constituting the rectilinear portions of the group of planar coils into a polymorphic cross-section; inserting the rectilinear portions of the group of planar coils into the slot portions of the core member taking the form of a rectangular parallelepiped to incorporate the group of planar coils in the core member; and bending the core member into which the group of planar coils are incorporated into a cylindrical form to bring both ends of the core member into abutment with each other and welding the abutting ends of the core member. As a result, when the group of planar coils are incorporated into the core member, the work of deforming and forming the planar coils is alleviated, and a highly reliable stator can be obtained with high productivity and high yield.

Finally, since it comprises a step of spreading the tip end portion of the tooth portion of the stator core in the circumferential direction after the group of planar coils are incorporated into the core member, the core member can readily be incorporated without damaging the group of planar coils.

What is claimed is:

1. A stator of an AC generator for use in a vehicle comprising:

a cylindrical stator core in which a plurality of tooth portions are provided at equiangular intervals along the inner circumference of a cylindrical core back portion and a plurality of slot portions are each formed between adjacent tooth portions; and a stator coil incorporated in said stator core, said stator coil having a group of coils constituted by predetermined numbers of turns of conductor wires and including a plurality of rectilinear portions and coil end portions interconnecting the end portions of adjacent rectilinear portions, said rectilinear portions being sequentially accommodated in the slot portions of every predetermined number of slots and said coil end portions being protruded axially outwardly from the end surface of said stator core;

wherein at least one of the group of conductor wires constituting said rectilinear portion, which are accommodated within said slot portion, is formed into a deformable polymorphic cross-section; and wherein the ratio of the overall cross-sectional area of the group of conductor wires constituting said rectilinear portion accommodated within said slot portion relative to the cross-sectional area of said slot portion is not less than 75%, wherein said group of conductor wires constituting said rectilinear portion which are accommodated within said slot portion comprises a group of conductor wires taking the form of a polymorphic cross-section, wherein said group of conductor wires constituting said rectilinear portion which are accommodated within said slot portion further comprises another group of conductor wires taking the form of a circular cross-section, so that said group of conductor wires taking the form of a polymorphic cross-section are embedded with said group of conductor wires taking the form of a circular cross-section.

2. A stator of an AC generator as set for the in claim 1, wherein at least one of the group of conductor wires of polymorphic cross-section which constitute said rectilinear portion which are accommodated within said slot portion is directed such that the longitudinal axis of cross-section thereof extends the radial direction of said stator core.

* * * * *